United States Patent
Ren

(10) Patent No.: US 9,113,200 B2
(45) Date of Patent: Aug. 18, 2015

(54) LIVE CHANNEL SWITCHING AND RETURN DURING COMMERCIAL BREAKS

(71) Applicant: Verizon Patent and Licensing Inc., Basking Ridge, NJ (US)

(72) Inventor: Dahai Ren, Lincoln, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/042,053

(22) Filed: Sep. 30, 2013

(65) Prior Publication Data

US 2015/0095932 A1 Apr. 2, 2015

(51) Int. Cl.
| H04N 5/50 | (2006.01) |
| H04N 21/438 | (2011.01) |
| H04H 20/14 | (2008.01) |
| H04H 60/37 | (2008.01) |
| H04N 21/454 | (2011.01) |

(52) U.S. Cl.
CPC ........... *H04N 21/4383* (2013.01); *H04H 20/14* (2013.01); *H04H 60/375* (2013.01); *H04N 21/454* (2013.01)

(58) Field of Classification Search
None
See application file for complete search history.

(56) References Cited

U.S. PATENT DOCUMENTS

| 8,209,713 | B1* | 6/2012 | Lai et al. | 725/10 |
| 2001/0013124 | A1* | 8/2001 | Klosterman et al. | 725/36 |
| 2003/0221191 | A1* | 11/2003 | Khusheim | 725/35 |
| 2007/0011040 | A1* | 1/2007 | Wright et al. | 705/10 |
| 2007/0143816 | A1* | 6/2007 | Gupta et al. | 725/135 |
| 2008/0168500 | A1* | 7/2008 | Carlson et al. | 725/46 |
| 2008/0297669 | A1* | 12/2008 | Zalewski et al. | 348/844 |
| 2009/0288132 | A1* | 11/2009 | Hegde | 725/141 |
| 2010/0071007 | A1* | 3/2010 | Meijer | 725/58 |
| 2010/0153995 | A1* | 6/2010 | Belz et al. | 725/39 |
| 2010/0165966 | A1* | 7/2010 | Petion et al. | 370/338 |
| 2011/0109801 | A1* | 5/2011 | Thomas et al. | 348/565 |

OTHER PUBLICATIONS

Mark Hachman, "Dish Hopper DVR Now Records Commercial-Free", http://pcmag.com/article2/0.2817.2404297.00.asp, May 10, 2012, 4 pages.

* cited by examiner

*Primary Examiner* — John Schnurr
*Assistant Examiner* — Cynthia Fogg

(57) ABSTRACT

A device may detect a commercial break for a channel. The channel may be provided for output to a user. The device may determine another channel to provide based on detecting the commercial break for the channel. The other channel may not be associated with a commercial break. The device may provide the other channel for output to the user. The device may monitor the channel to detect that the commercial break for the channel has ended. The device may provide the channel for output to the user based on detecting that that the commercial break for the channel has ended.

19 Claims, 15 Drawing Sheets

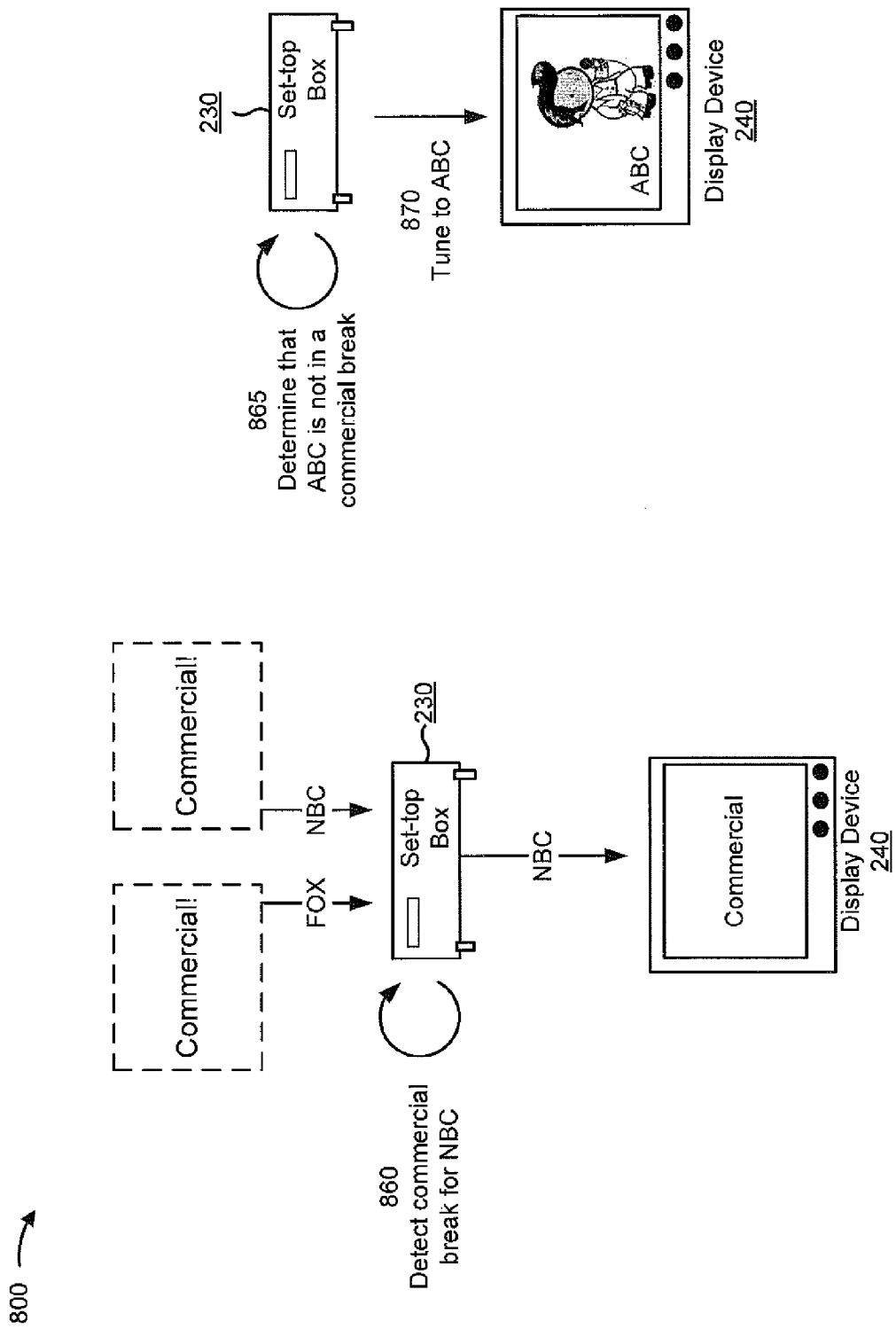

LIVE CHANNEL SWITCHING AND RETURN DURING COMMERCIAL BREAKS

BACKGROUND

Radio and television broadcasts generally include plenty of commercial breaks. Users often avoid commercials by changing channels.

BRIEF DESCRIPTION OF THE DRAWINGS

FIGS. 8A-8G are diagrams of another example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

A set-top box may receive a first channel from a content provider, and may provide the channel to a user via a display. A channel may carry content, such as a program (e.g., a television program), a commercial, or the like. An advertiser may pay a particular rate for a commercial to be aired on the channel based on the viewership of the channel (e.g., the quantity of users watching the channel). The set-top box may determine that a first channel has switched from providing a program to providing a commercial break based on processing the channel data stream (e.g., a video data stream, an audio data stream, or the like). The user may adjust the set-top box to receive another channel when a commercial break is detected for the first channel. However, switching from a first channel during a commercial break may result in switching to a second channel that is also in a commercial break, missing programming when the commercial break for the first channel ends, and inaccurate reporting of viewership metrics to an advertiser. Implementations described herein may use a set-top box to provide commercial skipping and channel return by switching to a second channel that is not in a commercial break, and by monitoring the first channel to determine when the commercial break has ended.

Figure 1:
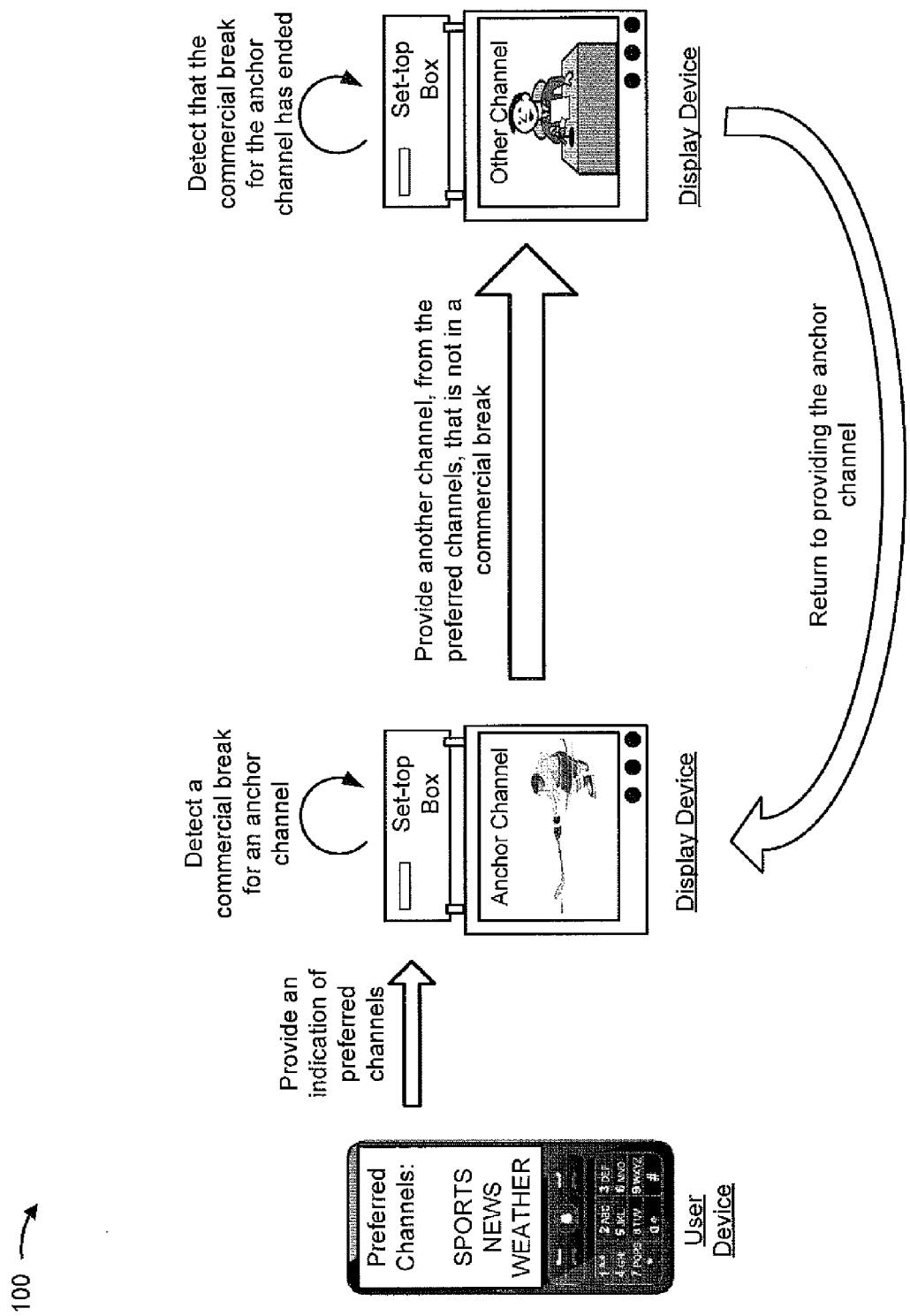
FIG. 1 is a diagram of an overview of an example implementation described herein.

FIG. 1 is a diagram of an overview of an example implementation 100 described herein. Example implementation 100 may include a user device, a set-top box, and a display device. As shown in FIG. 1, the set-top box may be configured to enable commercial skipping and return. Configuring commercial skipping and channel return may include the set-top box receiving an indication of a set of preferred channels from the user device. The set of preferred channels may include an indication of one or more channels to be selected from when a commercial break is detected for an anchor channel. For example, the user may select the set of preferred channels via the user device, and may provide an indication of the set of preferred channels to the set-top box. The set of preferred channels may include one or more channel identifiers (e.g., a channel name, a channel number, etc.), one or more channel preferences (e.g., a type of channel, a program associated with a channel, an actor being featured on a channel, etc.), or the like. In another example, the set-top box may determine the set of preferred channels based on viewership information, such as information identifying a viewing history of the user, information identifying a set of most viewed channels, or the like.

As further shown in FIG. 1, the set-top box may detect a commercial break for an anchor channel, and may determine to provide another channel. An anchor channel may refer to a channel away from which the set-top box is to tune when a commercial break is detected, and/or to which the set-top box is to return when the commercial break has concluded. The set-top box may select the other channel from the set of preferred channels, and may determine whether the other channel is in a commercial break. When the other channel is in a commercial break, the set-top box may select yet another channel from the set of preferred channels. When the other channel is not in a commercial break, the set-top box may provide the other channel via the display device. The set-top box may monitor the anchor channel, and may detect that the commercial break for the anchor channel has ended. Based on detecting that the commercial break for the anchor channel has ended, the set-top box may return to providing the anchor channel to the user via the display device. In another example, based on detecting that the commercial break for the anchor channel has ended the set-top box may provide a notification to the user (e.g., via the user device) indicating that the set-top box is to return to providing the anchor channel. In this way, a set-top box may provide commercial skipping to a user without missing programming when a commercial break ends.

While systems and methods may be described herein in terms of a set-top box and a television program, the systems and methods may also be implemented in terms of a radio receiver and a radio program. For example, the radio receiver may switch from an anchor radio channel to another radio channel when a commercial is detected for the anchor radio channel, and may return to the anchor radio channel when the commercial for the anchor radio channel has concluded.

Figure 2:
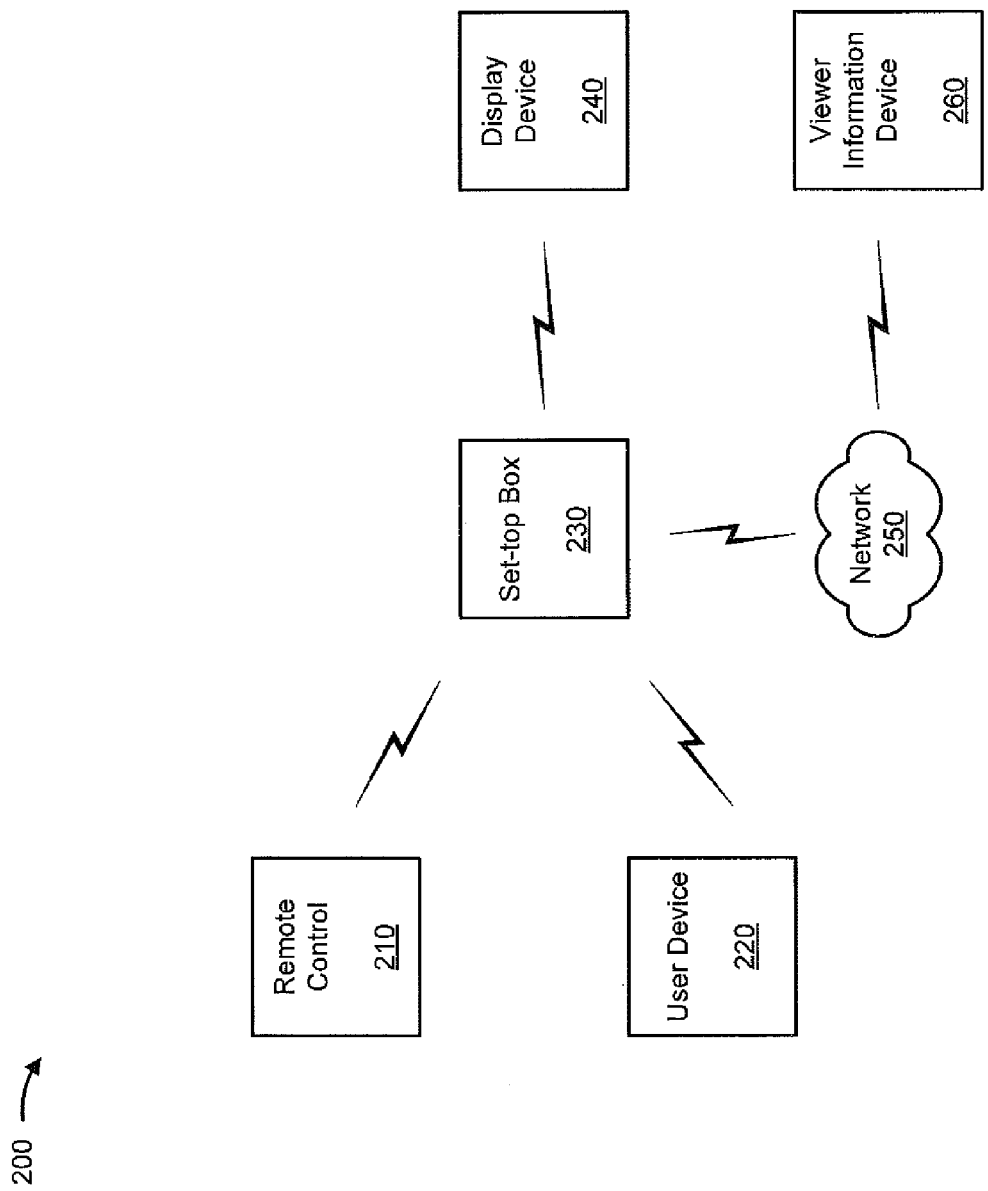
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include remote control 210, user device 220, set-top box 230, display device 240, network 250, and viewer information device 260. Devices of environment 200 may interconnect via wired connections, wireless connections, or a combination of wired and wireless connections.

Remote control 210 may include one or more devices capable of providing input to and/or receiving notifications from set-top box 230. For example, remote control 210 may include a television remote (e.g., an infrared control device, a radio frequency control device, etc.), a cable box remote, a smart remote, a universal remote, or the like. In some implementations, remote control 210 may provide information associated with enabling commercial switching to set-top box 230. Additionally, or alternatively, remote control 210 may receive notifications from set-top box 230, such as a notification associated with detecting a commercial break, a notification associated with detecting that the commercial break has concluded, or the like.

User device 220 may include one or more devices capable of receiving, generating, processing, storing, and/or providing information associated with commercial switching. For example, user device 220 may include a mobile phone (e.g., a smart phone), a radiotelephone, a personal communications system (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), or a similar type of device. In some implementations, user device 220 may provide a user interface for receiving input indicating a set of preferred channels for commercial switching. In some implementations, user device 220 may receive a notification from set-top box 230 indicating that a commercial break for a channel has concluded.

Set-top box 230 may include one or more devices capable of receiving, generating, processing, storing, and/or providing information associated with enabling commercial switching and channel return. For example, set-top box 230 may include an information device capable of tuning to a channel, and/or providing the channel to display device 240, such as a media client, a digital video recorder (DVR), a cable converter (e.g., a cable box, a digital television adapter, etc.), a CableCARD enabled device (e.g., a DVR, a personal computer, a television set, etc.), an integrated receiver/decoder, a hybrid set-top box (e.g., that may combine an integrated receiver/decoder with Internet/intranet access), an Internet protocol television (IPTV) receiver, or the like. Tuning to a channel may refer to receiving a signal associated with content (e.g., a television signal, a radio signal, a streaming web video signal, etc.) and/or processing the signal for output. In some implementations, set-top box 230 may receive viewership information from and/or provide viewership information to viewer information device 260 (e.g., via network 250). In some implementations, set-top box 230 may receive configuration information from remote control 210, user device 220, or the like.

Display device 240 may include a device capable of receiving, generating, processing, storing, and/or providing content. For example, display device 260 may include a television (TV), a computer monitor, a projector, a head-mounted display, a three-dimensional display, or the like. In some implementations, display device 240 may receive streaming content (e.g., a channel) from set-top box 230 (e.g., via network 250).

Network 250 may include one or more wired and/or wireless networks. For example, network 250 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. In some implementations, user device 220 may provide information to and/or receive information from set-top box 230 via network 250.

Viewer information device 260 may include one or more devices capable of receiving, generating, processing, storing, and/or providing viewership information. For example, viewer information device 260 may include a server capable of determining one or more metrics associated with viewership of a set of channels. In some implementations, viewer information device 260 may determine a set of "hot channels" (e.g., an ordering of channels based on a quantity of viewers, a rating, etc.). In some implementations, viewer information device 260 may receive information identifying a channel that is being provided to display device 240 by set-top box 230 (e.g., via network 250).

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while set-top box 230 and display device 240 are shown as separate devices, set-top box 230 and display device 240 may be implemented in a single device. Additionally, one or more of the devices of environment 200 may perform one or more functions described as being performed by another one or more devices of environment 200.

Figure 3:
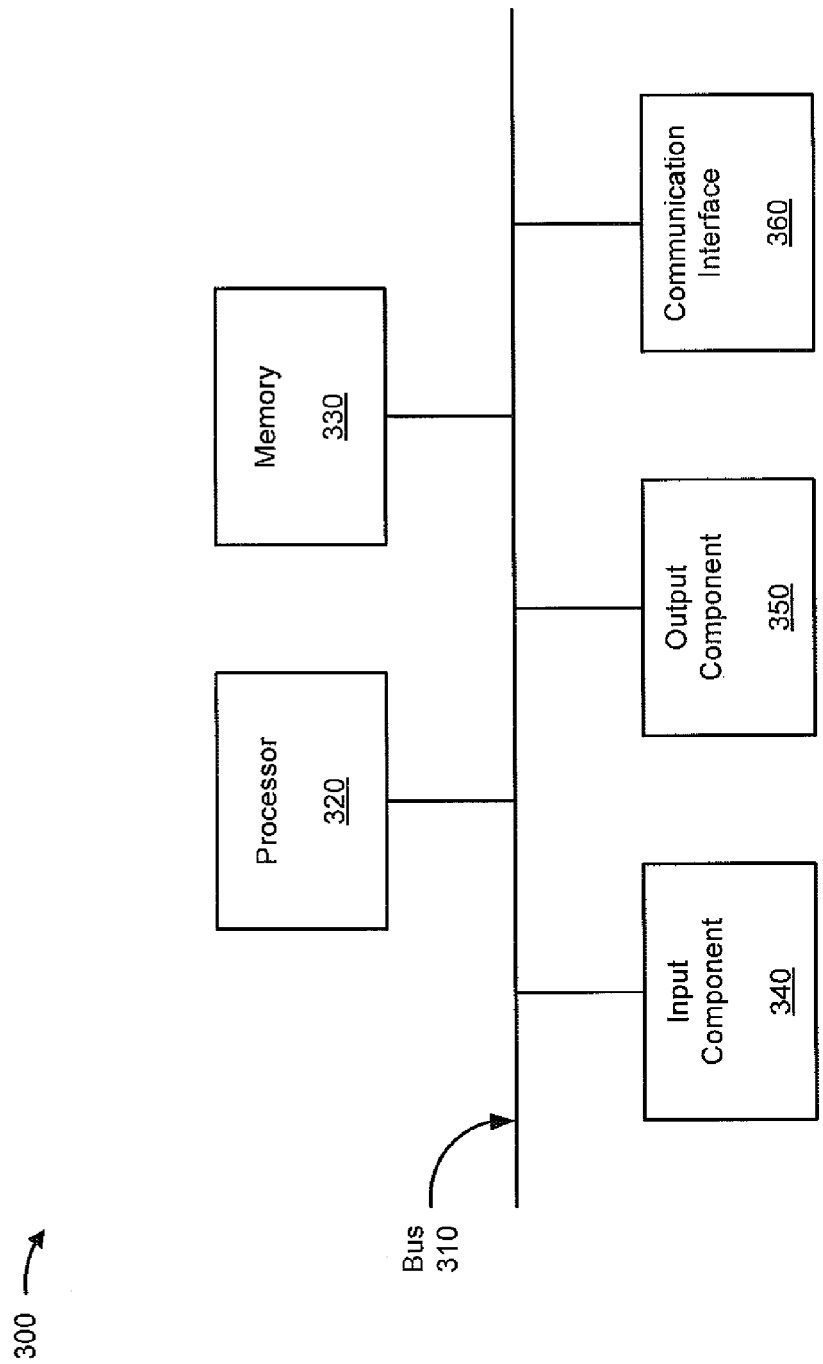
FIG. 3 is a diagram of example components of one or more devices of FIG. 2.

FIG. 3 is a diagram of example components of a device 300. Device 300 may correspond to remote control 210, user device 220, set-top box 230, display device 240, and/or viewer information device 260. In some implementations, each of remote control 210, user device 220, set-top box 230, display device 240, and/or viewer information device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
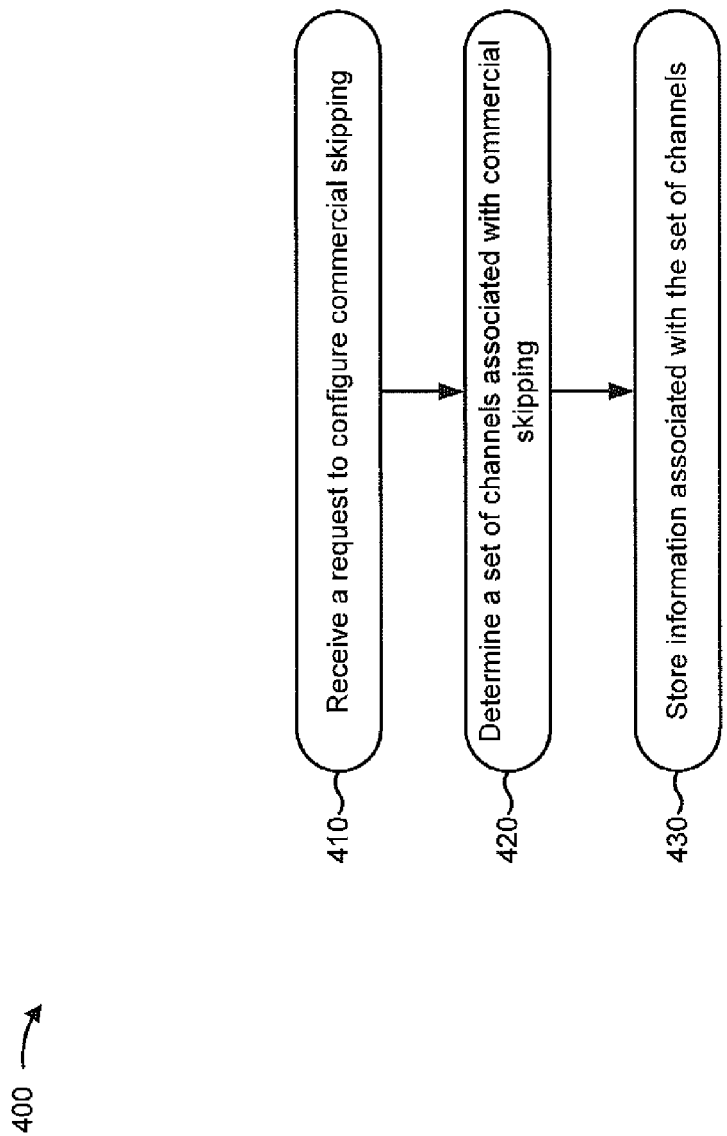
FIG. 4 is a flow chart of an example process for configuring a set-top box for commercial skipping and channel return.

FIG. 4 is a flow chart of an example process for configuring a set-top box for commercial skipping and channel return. In some implementations, one or more process blocks of FIG. 4 may be performed by set-top box 230. Additionally, or alternatively, one or more process blocks of FIG. 4 may be performed by another device or a group of devices separate from or including set-top box 230, such as remote control 210, user device 220, display device 240, and/or viewer information device 260.

As shown in FIG. 4, process 400 may include receiving a request to configure commercial skipping (block 410). For example, set-top box 230 may receive the request to configure commercial skipping from user device 220. In some implementations, set-top box 230 may receive the request to configure commercial skipping via user input (e.g., via remote control 210). A commercial and/or a commercial break may be used broadly to refer to a subset of programming associated with a channel (e.g., a TV channel, a radio channel, etc.), such as an advertisement, a segment of a particular program (e.g., a weather report, an interview, a scene, etc.), a station identification break, or the like. For example, a user may request to configure set-top box 230 to change from an anchor channel that is determined to be providing a commercial to another channel that is determined not to be providing a commercial.

The request to configure commercial skipping may include information identifying the anchor channel, in some implementations. For example, set-top box 230 may receive, from user device 220, a channel identifier for the anchor channel (e.g., a channel number, a channel name, etc.). Additionally, or alternatively, the request to configure commercial skipping may indicate that the anchor channel is to be a current channel (e.g., a channel that set-top box 230 is receiving when commercial skipping is enabled). For example, set-top box 230 may determine that the current channel being provided to display device 240 is to be used as the anchor channel. In this case, set-top box 230 may determine that commercial skipping is authorized for the anchor channel by querying an authorization device, such as viewer information device 260, a content server, or the like. For example, set-top box 230 may determine that commercial skipping is not authorized for the anchor channel (e.g., a channel provider has indicated that commercial skipping is to be disabled for a particular channel, at a particular time, during a particular program, or the like), and may provide a notification to the user (e.g., via user device 220), that another anchor channel may be selected.

The request to configure commercial skipping may include an indication of the action to be taken when a commercial is detected for the anchor channel. For example, set-top box 230 may receive from user device 220, an indication that set-top box 230 is to tune from the anchor channel to another channel. Additionally, or alternatively, set-top box 230 may be configured to tune from the anchor channel to multiple other channels (e.g., via a split-screen display device 240, a picture-in-picture display device 240, etc.). In some implementations, the request to configure commercial skipping may indicate that set-top box 230 is to provide one or more notifications associated with commercial skipping. For example, set-top box 230 may be configured to provide a notification indicating that a detected commercial break has concluded. In this case, set-top box 230 may provide the notification via remote control 210, user device 220, display device 240, or the like.

The request to configure commercial skipping may include information associated with detecting commercial breaks. For example, set-top box 230 may receive information identifying one or more commercial detection parameters, such as a commercial detection method (e.g., an algorithm, an audio characteristic, a video characteristic, etc.), a commercial detection sensitivity, or the like. Additionally, or alternatively, set-top box 230 may receive information identifying a device from which to receive commercial detection notifications. For example, set-top box 230 may be configured to identify a commercial break based on receiving a notification (e.g., from viewer information device 260, from a content server, or the like).

As further shown in FIG. 4, process 400 may include determining a set of channels associated with commercial skipping (block 420). For example, set-top box 230 may determine the set of channels to which to tune when a commercial break is detected. In some implementations, the set of channels may be a fixed set of channels. For example, set-top box 230 may determine a set of multiple channels to be associated with commercial skipping. In this case, when set-top box 230 detects a commercial, set-top box 230 may provide one of the fixed set of channels to display device 240. Additionally, or alternatively, set-top box 230 may receive information associated with determining a variable set of channels. For example, a user may indicate that set-top box 230 is to determine a first set of channels when a first commercial break is detected and another set of channels when another commercial break is detected. In this case, set-top box 230 may provide one of the first set of channels when the first commercial break is detected, and may provide one of the other set of channels when the other commercial break is detected.

Set-top box 230 may determine the set of channels based on querying user device 220, in some implementations. For example, set-top box 230 may receive information identifying a set of channels selected via user input to user device 220. Additionally, or alternatively, set-top box 230 may receive information identifying a set of channel preferences, such as a preferred type of channel (e.g., a sports channel, a news channel, a movie channel, etc.), a preferred subtype of channel (e.g., a channel showing a particular sports team, a particular movie, a particular actor, etc.), or the like. In this case, set-top box 230 may determine the set of channels based on the channel preferences. Additionally, or alternatively, set-top box 230 may receive user input indicating the set of channels, the set of channel preferences, etc., via remote control 210.

Set-top box 230 may determine the set of channels associated with commercial skipping based on viewership information, in some implementations. For example, set-top box 230 may receive viewership information from viewer information device 260, such as a set of most watched channels associated with a set of subscribers, a set of saved channel preferences associated with a user, a set of previously watched channels associated with the user, a set of previously watched programs associated with the user (e.g., from which a set of channels that provide the previously watched programs may be determined), a set of recorded programs (e.g., from which a set of program preferences may be determined), programming information (e.g., information identifying content associated with a channel, such as a program guide), or the like. In this case, set-top box 230 may determine the set of channels based on the channel information.

Set-top box 230 may determine a user profile, in some implementations. For example, set-top box 230 may receive information identifying a user, and may determine the set of channels based on the information identifying the user. In some implementations, set-top box 230 may maintain multiple user profiles for selection. For example, when a first user profile is selected, set-top box 230 may determine a first set of channels associated with a first user, and when another user profile is selected, set-top box 230 may determine another set of channels associated with another user.

Set-top box 230 may determine one or more other sources as the set of channels, in some implementations. For example, a user may indicate (e.g., via remote control device 210), that set-top box 230 is to tune to one or more other sources when a commercial break is detected for an anchor channel, such as a recorded program, a web page, a radio program, a video game, or the like.

As further shown in FIG. 4, process 400 may include storing information associated with the set of channels (block 430). For example, set-top box 230 may provide information identifying the set of channels to viewer information device 260 for storage. Additionally, or alternatively, set-top box 230 may store information identifying the set of channels locally. In some implementations, the information identifying the set of channels may include a channel ranking (e.g., a preferential ordering of the set of channels). Additionally, or alternatively, set-top box 230 may provide information identifying a dataset to query to determine the set of channels (e.g., a dataset stored by viewer information device 260 that identifies previously watched channels, most watched channels, etc.). For example, set-top box 230 may store information indicating that a program guide is to be queried to determine the set of channels. In some implementations, storing information associated with the set of channels may include storing an identification of a recipient device for notifications associated with commercial skipping. For example, set-top box 230 may store information identifying user device 220 as a recipient for notifications associated with indicating that a commercial break has concluded.

In this way, a set-top box may be configured to provide commercial skipping and channel return to a set of preferred channels.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
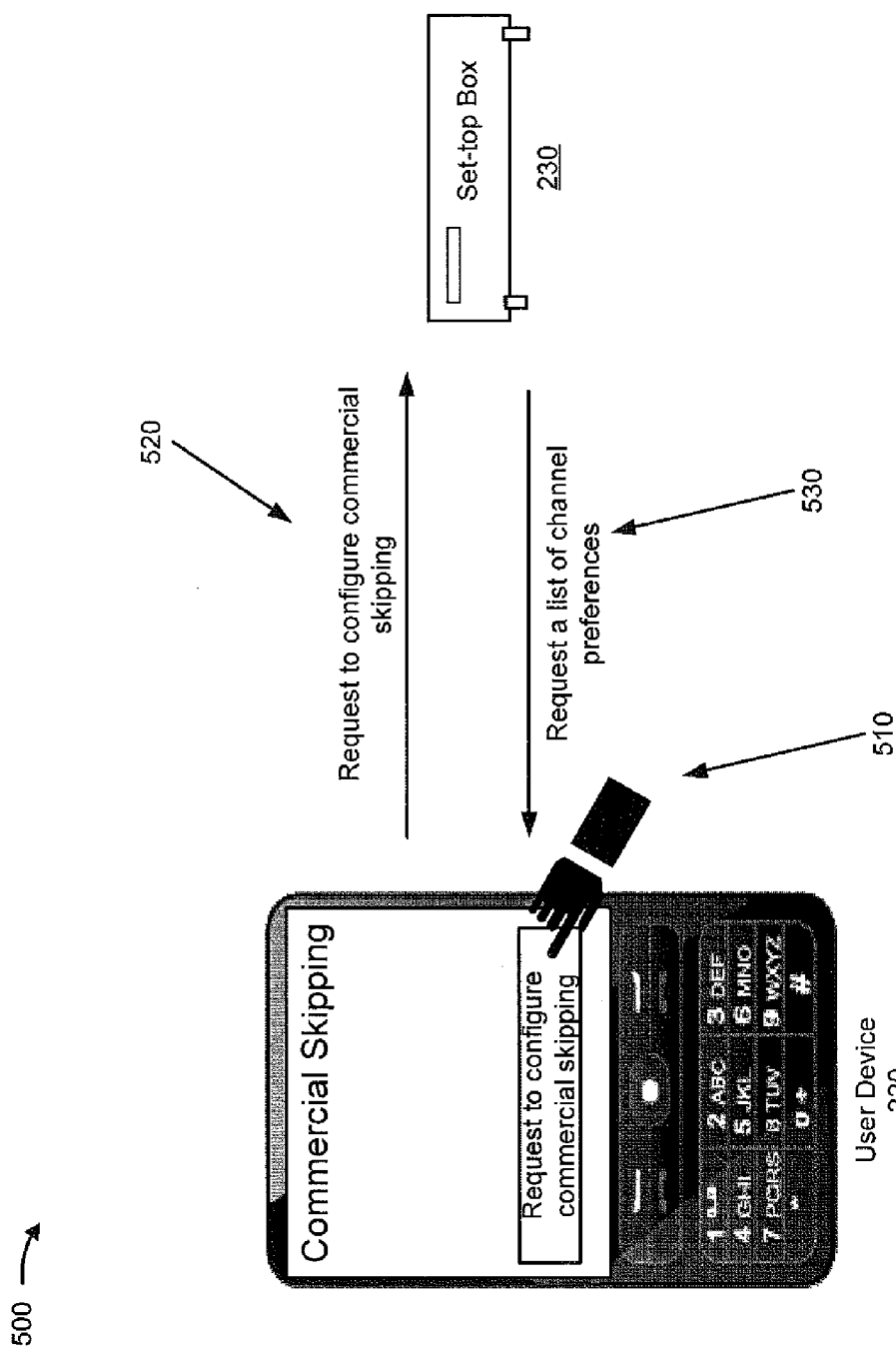
FIGS. 5A and 5B are diagrams of an example implementation relating to the example process shown in FIG. 4.
Figure 5B:
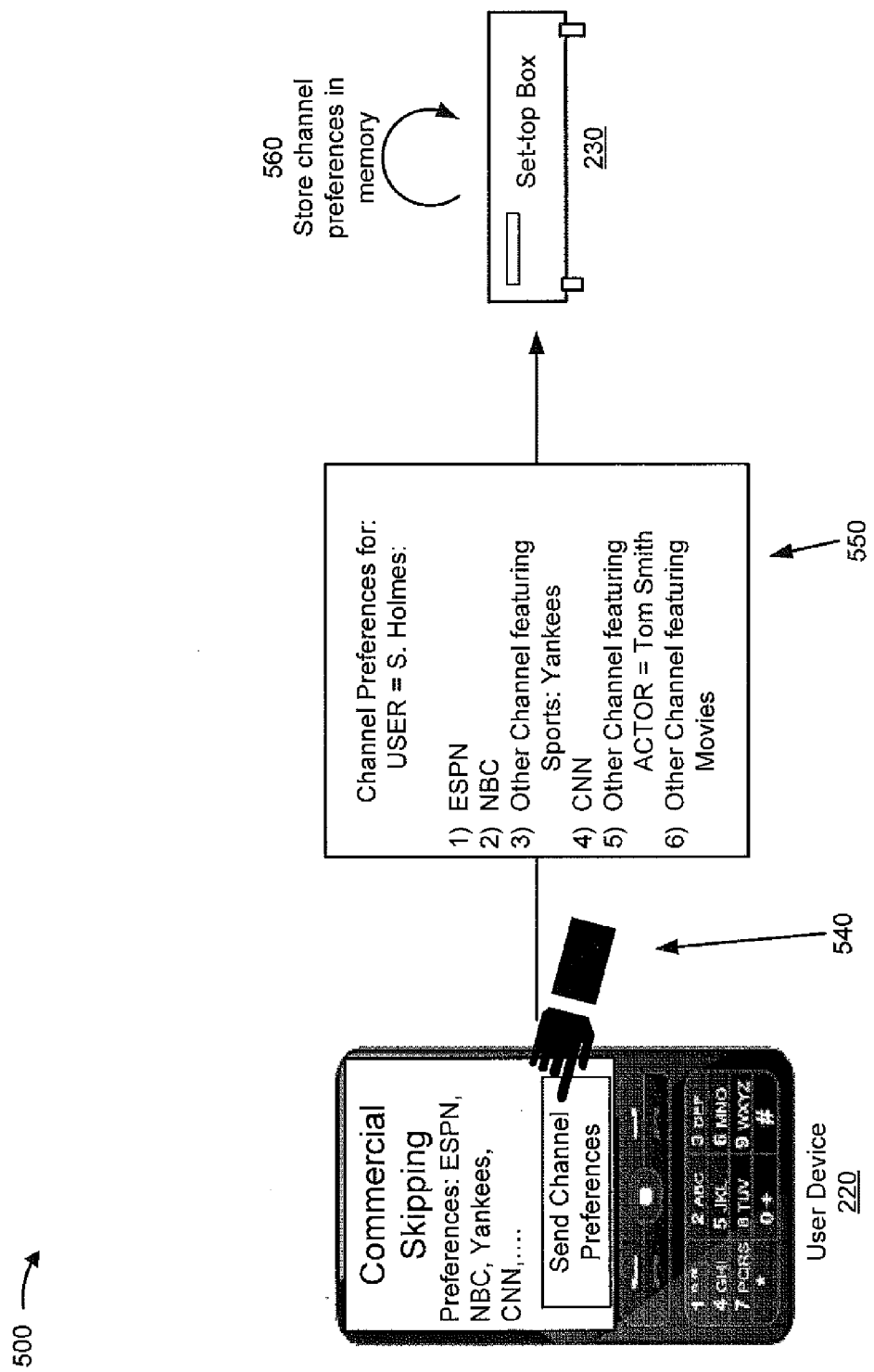

FIGS. 5A and 5B are diagrams of an example implementation 500 relating to process 400 shown in FIG. 4. As shown in FIG. 5A, example implementation 500 may include user device 220 and set-top box 230. As shown by reference number 510, based on user interaction with a button, a user requests that commercial skipping be configured. As shown by reference number 520, set-top box 230 receives the request to configure commercial skipping from user device 220, and as shown by reference number 530, set-top box 230 requests a list of channel preferences from user device 220.

As shown in FIG. 5B, user device 220 determines a set of channel preferences associated with commercial skipping (e.g., via user input), and as shown by reference number 540, based on user interaction with a button, user device 220 provides the channel preferences to set-top box 230 (e.g., via network 230). As shown by reference number 550, the channel preference information includes an identification of the user with whom the channel preferences are to be associated (e.g. "S. Holmes") and a set of channel preferences. The set of channel preferences includes a preferential ranking of channels, (e.g., "ESPN," "NBC," "CNN"), channel types (e.g., "Movies"), and channel subtypes (e.g., a channel featuring a sports team, "Yankees" and a channel featuring particular actor, "Tom Smith"). When a commercial is detected, set-top box 230 may query content information (e.g., program guide information) to determine one or more channels that match the channel type and/or channel subtype preferences (e.g., a channel showing a movie, a channel providing a program featuring "Tom Smith," etc.). As shown by reference number 560, set-top box 230 stores the received channel preference information locally for use during commercial skipping.

As indicated above, FIGS. 5A and 5B are provided merely as an example. Other examples are possible and may differ from what was described with regard to FIGS. 5A and 5B.

Figure 6:
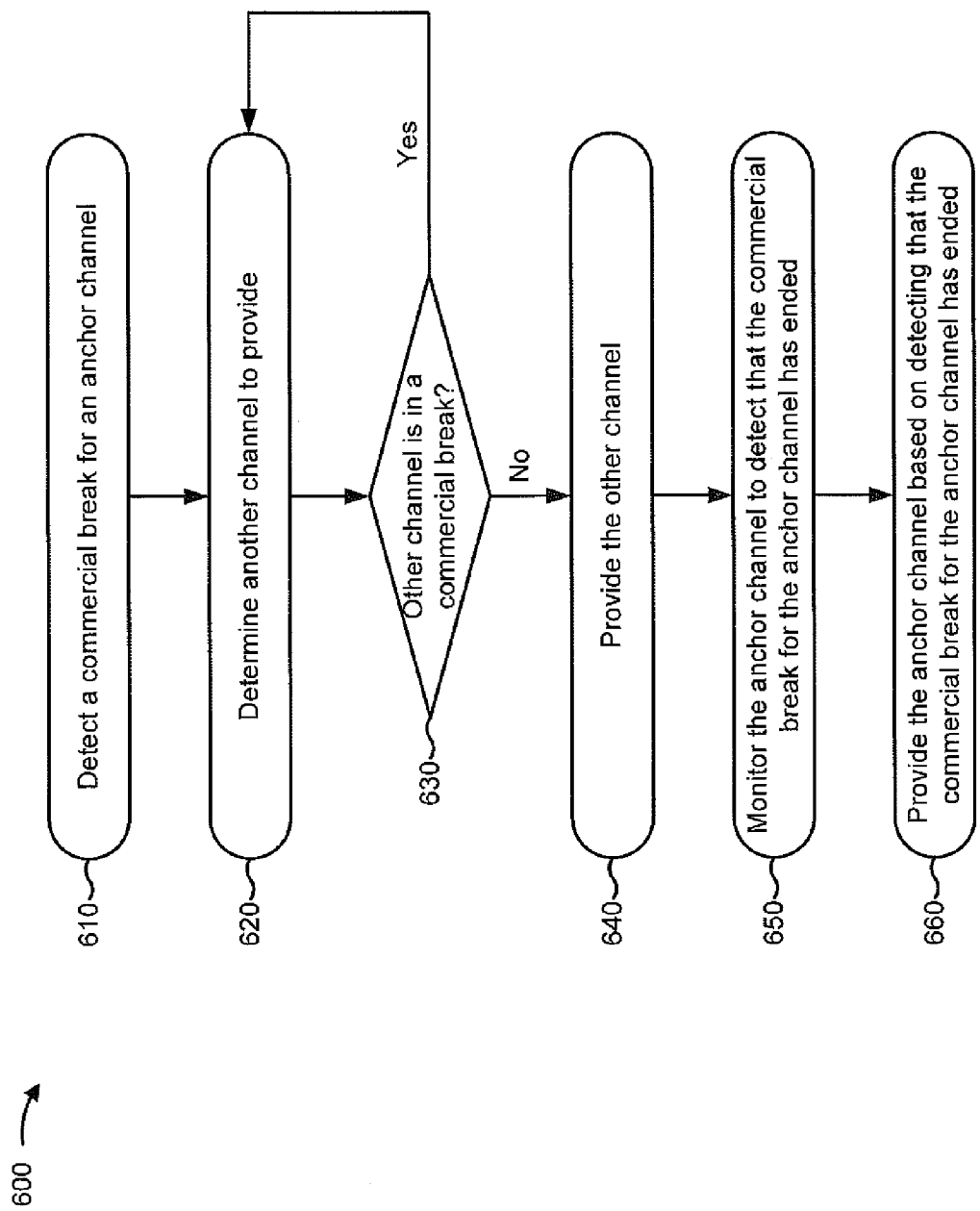
FIG. 6 is a flow chart of an example process for providing commercial skipping and channel return via a set-top box.

FIG. 6 is a flow chart of an example process 600 for providing commercial skipping and channel return via a set-top box. In some implementations, one or more process blocks of FIG. 6 may be performed by set-top box 230. Additionally, or alternatively, one or more process blocks of FIG. 6 may be performed by another device or a group of devices separate from or including set-top box 230, such as remote control 210, user device 220, display device 240, and/or viewer information device 260.

As shown in FIG. 6, process 600 may include detecting a commercial break for an anchor channel (block 610). For example, set-top box 230 may detect the commercial break for the selected anchor channel. In some implementations, the anchor channel may be selected by set-top box 230 based on stored configuration information associated with commercial skipping. Additionally, or alternatively, set-top box 230 may select the anchor channel based on a current channel, based on user input, or the like. For example, a user may indicate (e.g., via remote control 210), one or more channels for which commercial skipping is to be enabled. In this case, set-top box 230 may select the anchor channel as the current channel based on determining that the current channel is one of the one or more channels for which commercial skipping is to be enabled.

In some implementations, set-top box 230 may detect the commercial break based on monitoring a channel data stream, such as by processing a channel data signature, an audio component characteristic, a video component characteristic, or the like. In some implementations, set-top box 230 may detect the commercial break based on detecting a trigger, associated with identifying a commercial, embedded in the data stream. Additionally, or alternatively, set-top box 230 may receive information indicating a commercial break for the anchor channel (e.g., via network 250).

As further shown in FIG. 6, process 600 may include determining another channel to provide (block 620). For example, set-top box 230 may determine another channel that is to be provided to display device 240. In some implementations, set-top box 230 may determine the other channel based on retrieving stored information identifying a set of preferred channels. Additionally, or alternatively, set-top box 230 may query viewer information device 260 to determine the other channel.

When determining the other channel to provide, set-top box 230 may identify a set of channels, in some implementations. For example, set-top box 230 may retrieve an ordered list of channels that are to be provided when a commercial break is detected. In this case, set-top box 230 may select a channel from the ordered list of channels (e.g., a highest ordered channel from the ordered list of channels). Additionally, or alternatively, determining the other channel to provide may include determining a channel based on a user preference. For example, set-top box 230 may determine a particular type of channel (e.g., a sports channel, a movie channel, a news channel, etc.), and may identify a channel associated with the particular type. In another example, set-top box 230 may query viewer information device 260 to identify a "hot channel" (e.g., a most watched channel).

When determining the other channel, set-top box 230 may access specified content, in some implementations. For example, a user may indicate (e.g., via remote control 210) one or more other sources for content, such as a web page, a radio program, a video game, a stored entertainment program, or the like, that set-top box 230 is to access as the other channel. In this case, set-top box 230 may configure the other source to be provided to the user as the other channel.

As further shown in FIG. 6, process 600 may include determining whether the other channel is in a commercial break (block 630). For example, set-top box 230 may monitor the programming for the other channel. In some implementations, set-top box 230 may tune to the other channel to determine whether the other channel is in commercial. Additionally, or alternatively, set-top box 230 may receive information indicating whether the other channel is in commercial. For example, set-top box 230 may receive a message indicating that the other channel is providing a commercial (e.g., via network 250).

As further shown in FIG. 6, if the other channel is in a commercial break (block 630—YES), then process 600 may include determining another channel to provide (block 620). For example, set-top box 230 may determine another channel that is to be provided, as discussed herein in connection with block 620. In this case, when set-top box 230 is configured to select another channel from a set of channels, set-top box 230 may select a next channel from the set of channels (e.g., determined based on a preferential ordering, a numerical ordering, an alphabetical ordering, or the like).

As further shown in FIG. 6, if the other channel is not in a commercial break (block 630—NO), then process 600 may include providing the other channel (block 640). For example, set-top box 230 may tune to the other channel, and may provide the other channel to display device 240. In some implementations, set-top box 230 may provide information indicating that a commercial is being skipped. For example, set-top box 230 may provide a notification to the user (e.g. via user device 220). Additionally, or alternatively, set-top box 230 may provide a notification to viewer information device 260. In this case, viewer information device 260 may store information indicating that the user associated with set-top box 230 is skipping commercials, thereby facilitating an accounting of commercial viewership (e.g., a determination that indicates that commercials are not being viewed by a viewer of the anchor channel) that may be provided to an advertiser.

In some implementations, providing the other channel may include monitoring for a commercial break on the other channel. For example, set-top box 230 may detect a commercial break for the other channel, as discussed herein in connection with block 610, and may select yet another channel to be provided.

As further shown in FIG. 6, process 600 may include monitoring the anchor channel to detect that the commercial break for the anchor channel has ended (block 650). For example, set-top box 230 may determine that the commercial break for the anchor channel has ended based on monitoring the data stream associated with the anchor channel, as discussed herein in connection with block 610. Additionally, or alternatively, set-top box 230 may receive an indication that the commercial break for the anchor channel has ended (e.g., via network 250).

When monitoring the data stream, set-top box 230 may tune to the anchor channel, in some implementations. For example, set-top box 230 may tune to both the anchor channel and the other channel while providing the other channel. In this case, set-top box 230 may process the data stream, a data signature associated with the data stream, an audio or video characteristic associated with the data stream, or the like to detect that the commercial break for the anchor channel has ended. Additionally, or alternatively, when monitoring the data stream, set-top box 230 may record the anchor channel. For example, set-top box 230 may record the anchor channel while tuning to the other channel, and may store the recording locally.

As further shown in FIG. 6, process 600 may include providing the anchor channel based on detecting that the commercial break for the anchor channel has ended (block 660). For example, set-top box 230 may provide the anchor channel to display device 240 for display. In some implementations, set-top box 230 may notify a user that the commercial break has ended. For example, set-top box 230 may overlay a notification over the other channel provided to display device 240, prior to providing the anchor channel. Additionally, or alternatively, set-top box 230 may provide the notification to the user via user device 220. For example, set-top box 230 may provide the notification to user device 220 based on determining that the user is not within a particular proximity of display device 240. In this case, set-top box 230 may determine that user device 220 has been moved from a first room (e.g., a room including display device 240) to a second room, and may provide a notification indicating that the commercial has ended to the user of user device 220. For example, a user may indicate that the user is leaving a room (e.g., the room that includes display device 240) by providing input to user device 220, and user device 220 may notify set-top box 230 that the user has left the room.

Set-top box 230 may provide the anchor channel without missed programming via a recording, in some implementations. For example, set-top box 230 may determine that the commercial for the anchor channel has ended, and may request user input before returning to the anchor channel. In this case, when set-top box 230 returns to providing the anchor channel, set-top box 230 may provide the recording of the anchor channel (e.g., starting at the end of the commercial), thereby reducing missed programming.

In some implementations, set-top box 230 may receive user input indicating that the anchor channel is to be provided. For example, set-top box 230 may provide a notification to user device 220 based on detecting that the commercial break for the anchor channel has ended, and may receive an indication from user device 220 that set-top box 230 is to return to providing the anchor channel to display device 240 for display. In this case, the notification provided to user device 220 may request that a user press a button prior to set-top box 230 providing the anchor channel. In some implementations, providing the anchor channel based on detecting that the commercial break for the anchor channel has ended may include providing an indication that the anchor channel has been provided to the user. For example, set-top box 230 may notify viewer information device 260 that the anchor channel is being provided.

In this way, a set-top box may detect a commercial break for an anchor channel, and may thereupon provide another channel that is not in a commercial break. Furthermore, the set-top box may monitor the anchor channel, and may return to providing the anchor channel upon determining that the commercial break has concluded.

Although FIG. 6 shows example blocks of process 600, in some implementations, process 600 may include additional blocks, different blocks, fewer blocks, or differently arranged blocks than those depicted in FIG. 6. Additionally, or alternatively, two or more of the blocks of process 600 may be performed in parallel.

Figure 7A:
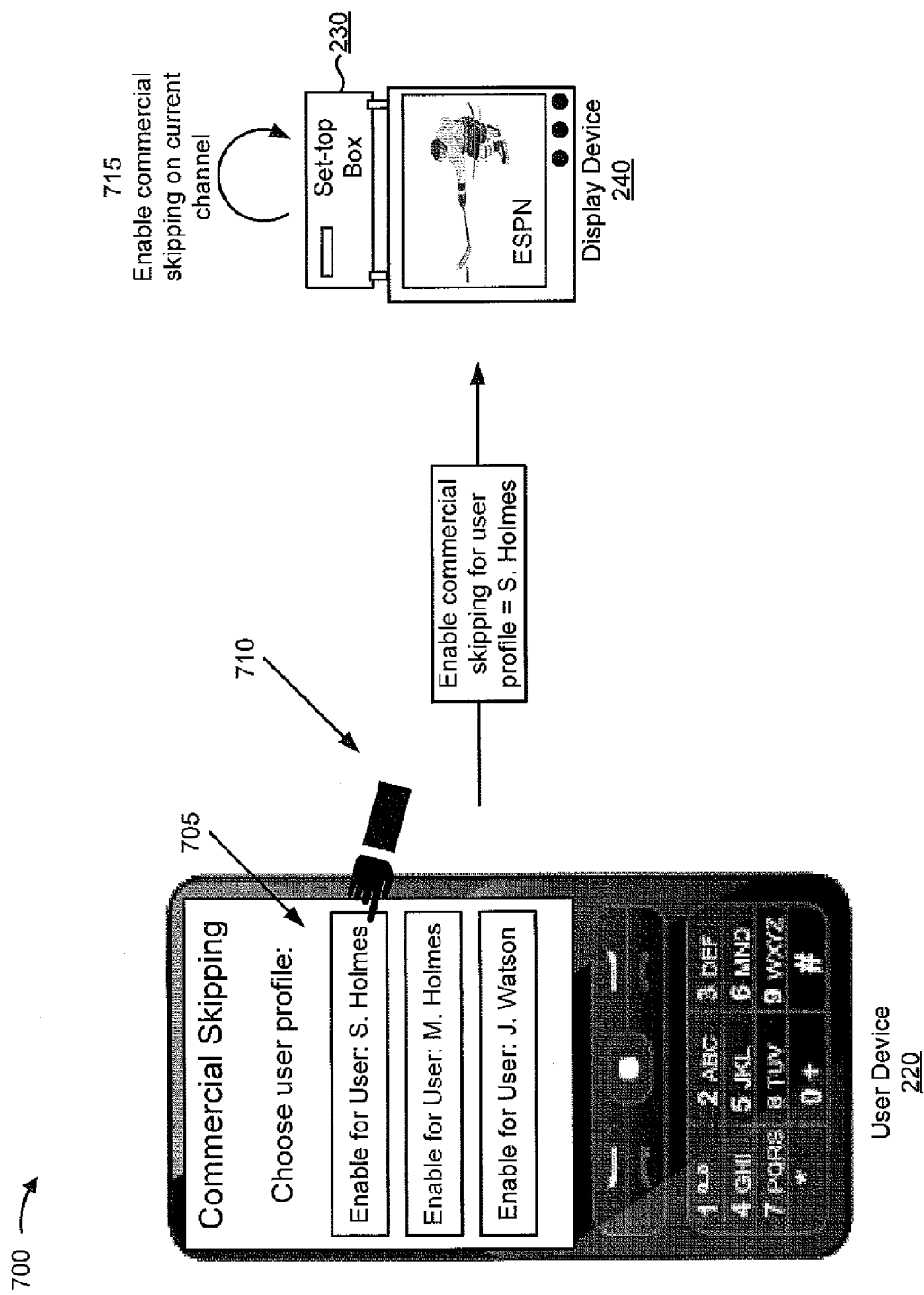
FIGS. 7A-7E are diagrams of an example implementation relating to the example process shown in FIG. 6.

FIGS. 7A-7E are diagrams of an example implementation 700 relating to process 600 shown in FIG. 6. As shown in FIG. 7A, example implementation 700 may include user device 220, set-top box 230, and display device 240. As shown by reference number 705, user device 220 is configured to allow a user to enable commercial skipping and channel return. The user is provided with user profiles (e.g., S. Holmes, M. Holmes, or J. Watson) associated with sets of channel preferences. As shown by reference number 710, based on user interaction with a button, user device 220 sends an indication that commercial skipping is to be enabled for the user profile identified as S. Holmes. As shown by reference number 715, set-top box 230 receives the request from user device 220, sets the anchor channel as a current channel (e.g., "ESPN"), and enables commercial skipping and channel return.

Figures 7B, 7C:
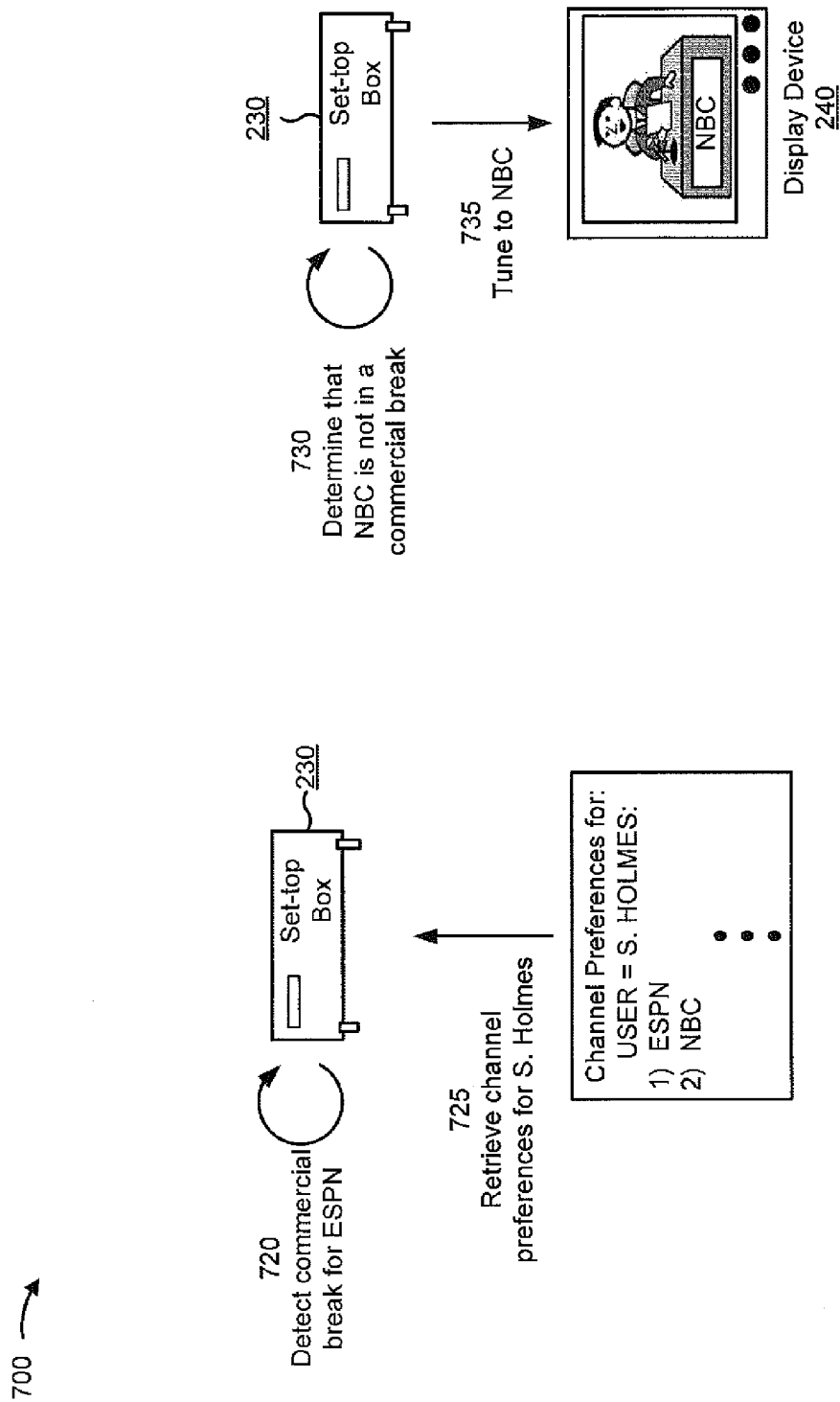

As shown in FIG. 7B, and by reference number 720, set-top box 230 detects a commercial break for ESPN. As shown by reference number 725, set-top box 230 retrieves a set of channel preferences for the user profile identified as S. Holmes. Assume that the set of channel preferences includes an ordered list of channels. As shown in FIG. 7C, assume that set-top box 230 skips ESPN because set-top box 230 has already detected a commercial break for ESPN. As shown by reference number 730, set-top box 230 determines that a next channel of the set of preferred channels (e.g., "NBC") is not in a commercial break. As shown by reference number 735, based on determining that NBC is not in a commercial break, set-top box 230 tunes to NBC, and provides NBC for display via display device 240.

Figures 7D, 7E:
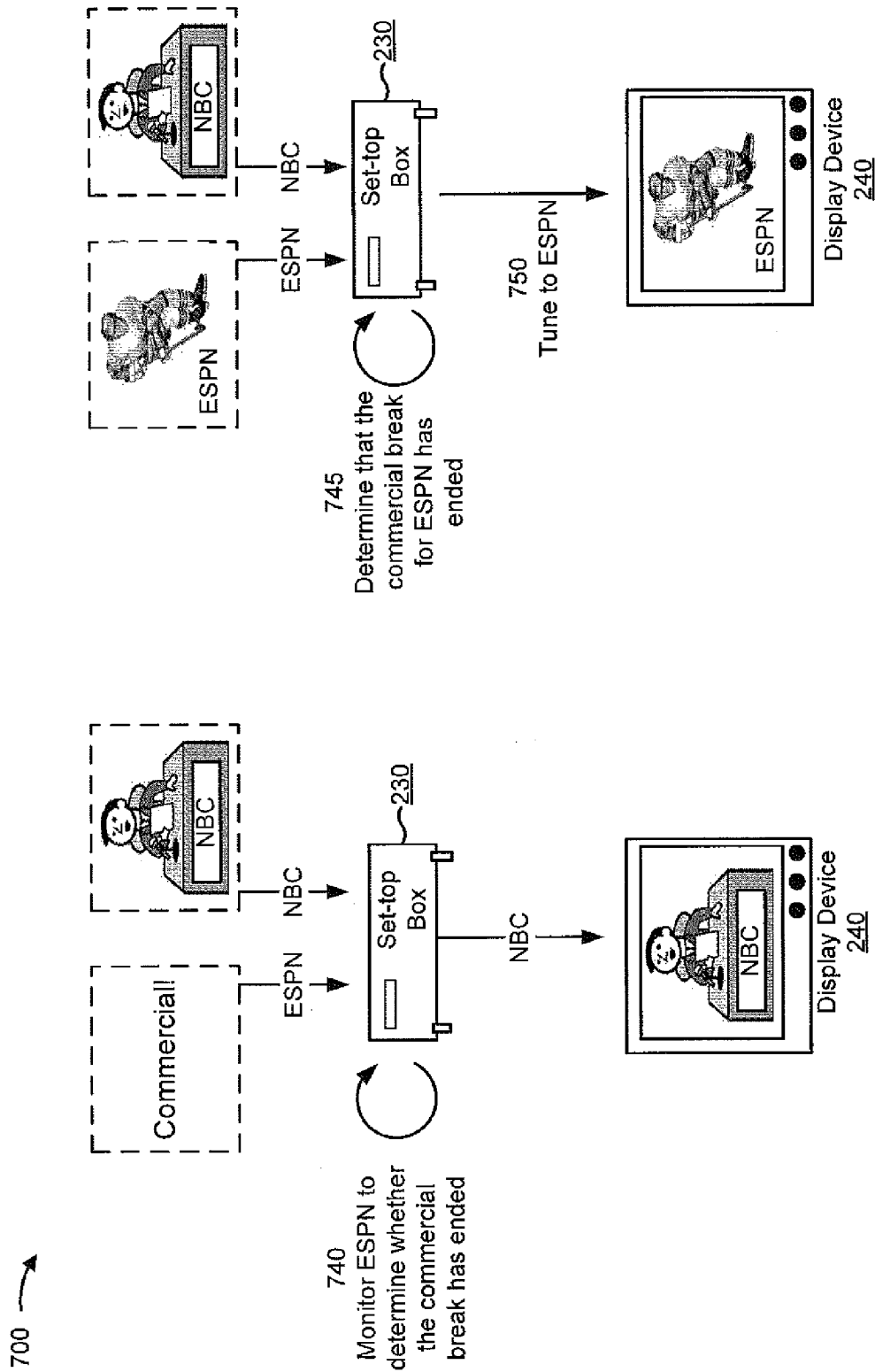

As shown in FIG. 7D, assume that set-top box 230 is receiving both ESPN and NBC, and that set-top box 230 is providing NBC for display. As shown by reference number 740, set-top box 230 monitors ESPN to determine whether the commercial break for ESPN has ended. As shown in FIG. 7E, and by reference number 745, set-top box 230 determines that the commercial break for ESPN has ended. As shown by reference number 750, set-top box 230 resumes tuning to ESPN, and provides ESPN for display via display device 240.

As indicated above, FIGS. 7A-7E are provided merely as an example. Other examples are possible and may differ from what was described with respect to FIGS. 7A-7E.

Figure 8A:
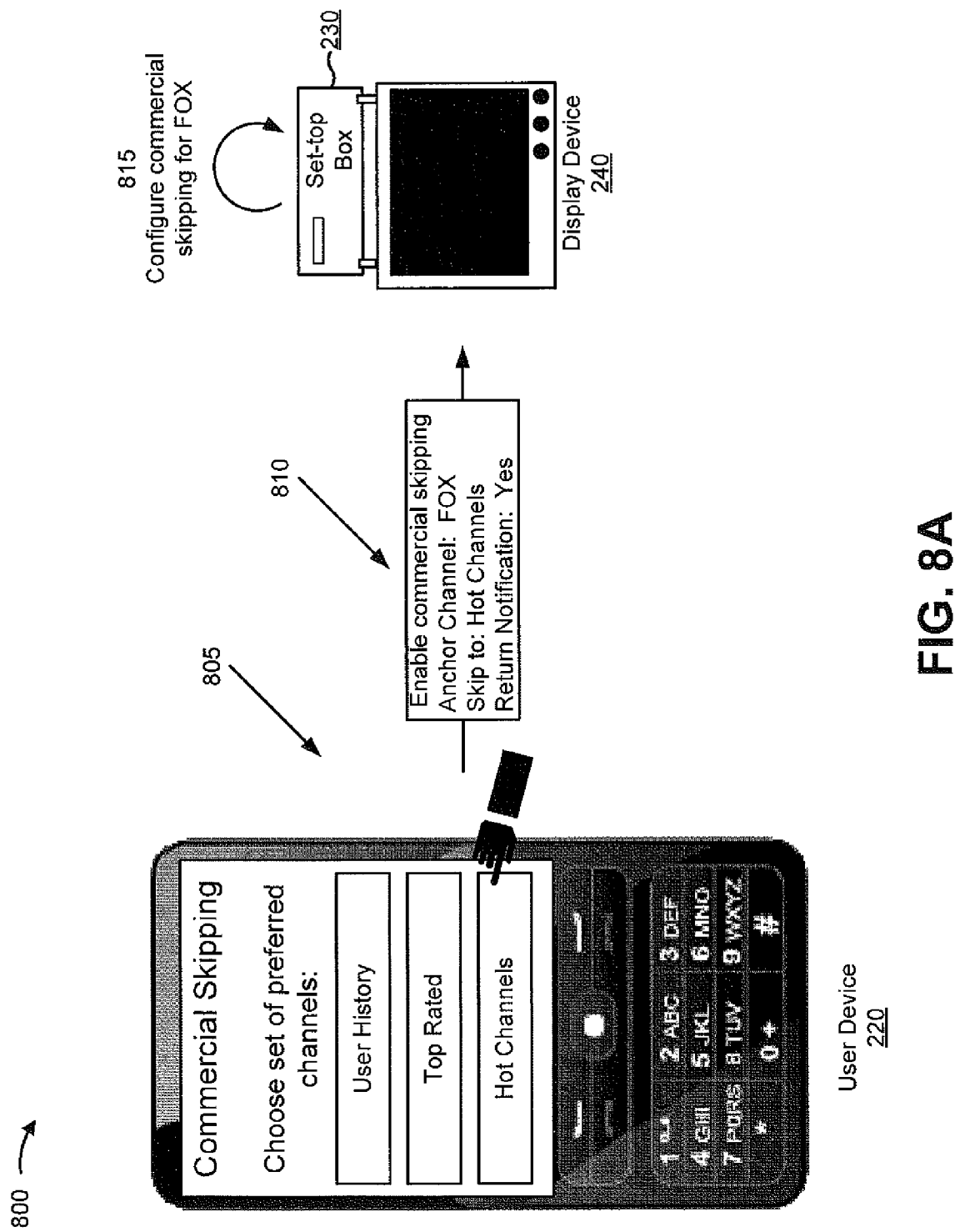

FIGS. 8A-8G are diagrams of another example implementation 800 relating to process 600 shown in FIG. 6. As shown in FIG. 8A, example implementation 800 includes user device 220, set-top box 230, and display device 240. User device 220 provides a user interface with which a user may select one of several options indicating a set of preferred channels to be used for commercial skipping. The options that may be selected by the user include "User History" (e.g., a set of preferred channels selected based on information identifying one or more channels previously watched by the user, by all users in a household, by all channel subscribers, or the like), "Top Rated" (e.g., a set of preferred channels selected based on information identifying channel ratings provided by the user, by all users in the household, by all channel subscribers, or the like), and "Hot Channels" (e.g., a set of preferred channels selected based on information identifying one or more channels to which a greatest quantity of subscribers are tuned).

As shown by reference number 805, based on user interaction with a button, user device 220 transmits a message to set-top box 230 indicating that commercial skipping and return is to be configured using hot channels (e.g., most watched channels) as the set of preferred channels. As shown by reference number 810, the message includes information identifying an anchor channel (e.g., "FOX"), the set of preferred channels, and an indication that set-top box 230 is to provide a notification (e.g., via user device 220) when returning from a commercial break. As shown by reference number 815, set-top box 230 receives the message from user device 220, and set-top box 230 configures commercial skipping for FOX.

Figure 8B:
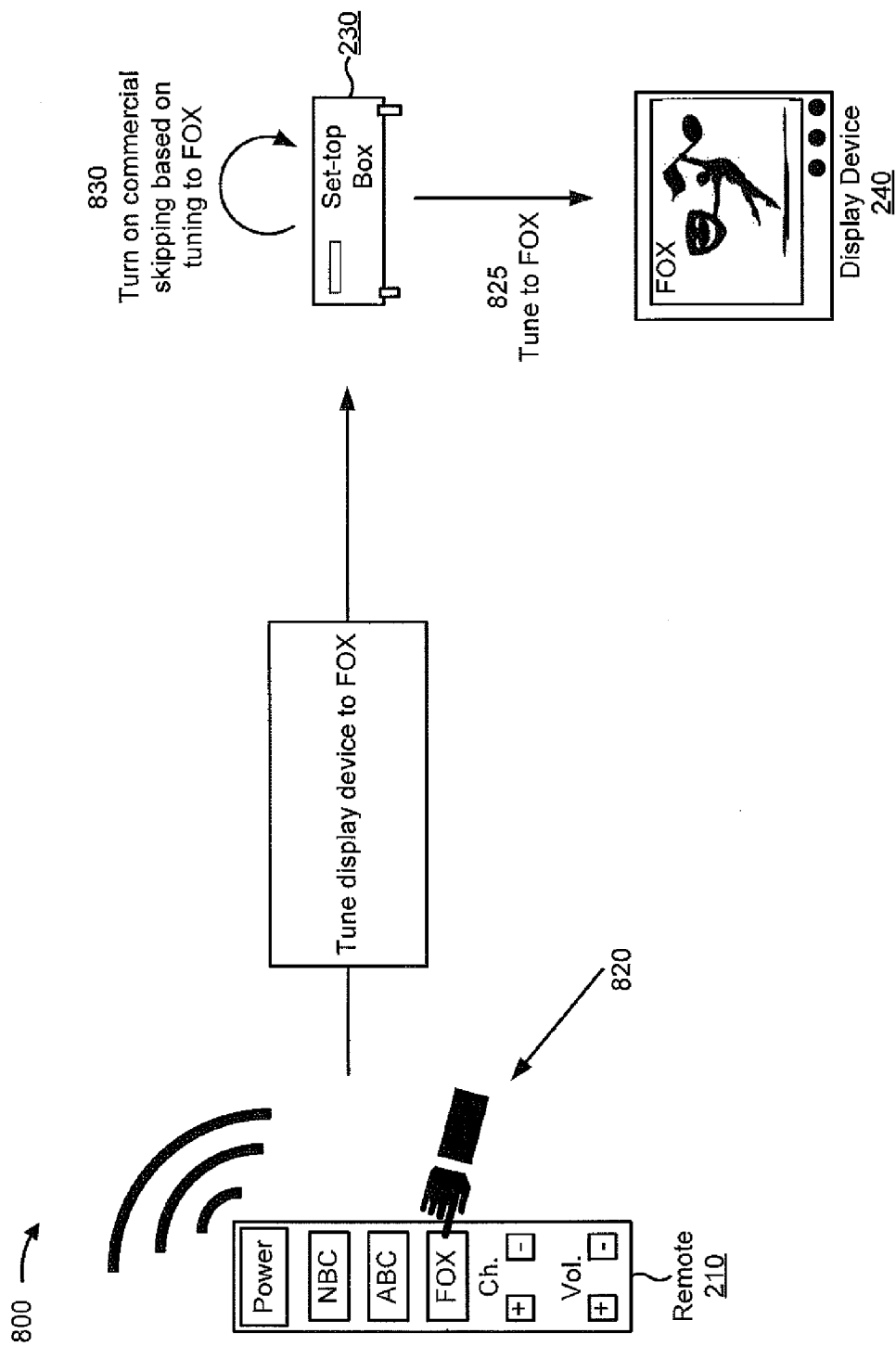

As shown in FIG. 8B, and by reference number 820, based on user interaction with a button, remote control 210 instructs set-top box 230 to tune to FOX. As shown by reference number 825, set-top box 230 tunes to FOX based on receiving the instruction from remote control 210. As shown by reference number 830, set-top box 230 determines that FOX has been set as the anchor channel, and set-top box 230 enables commercial skipping based on having tuned to the anchor channel.

Figures 8C, 8D:
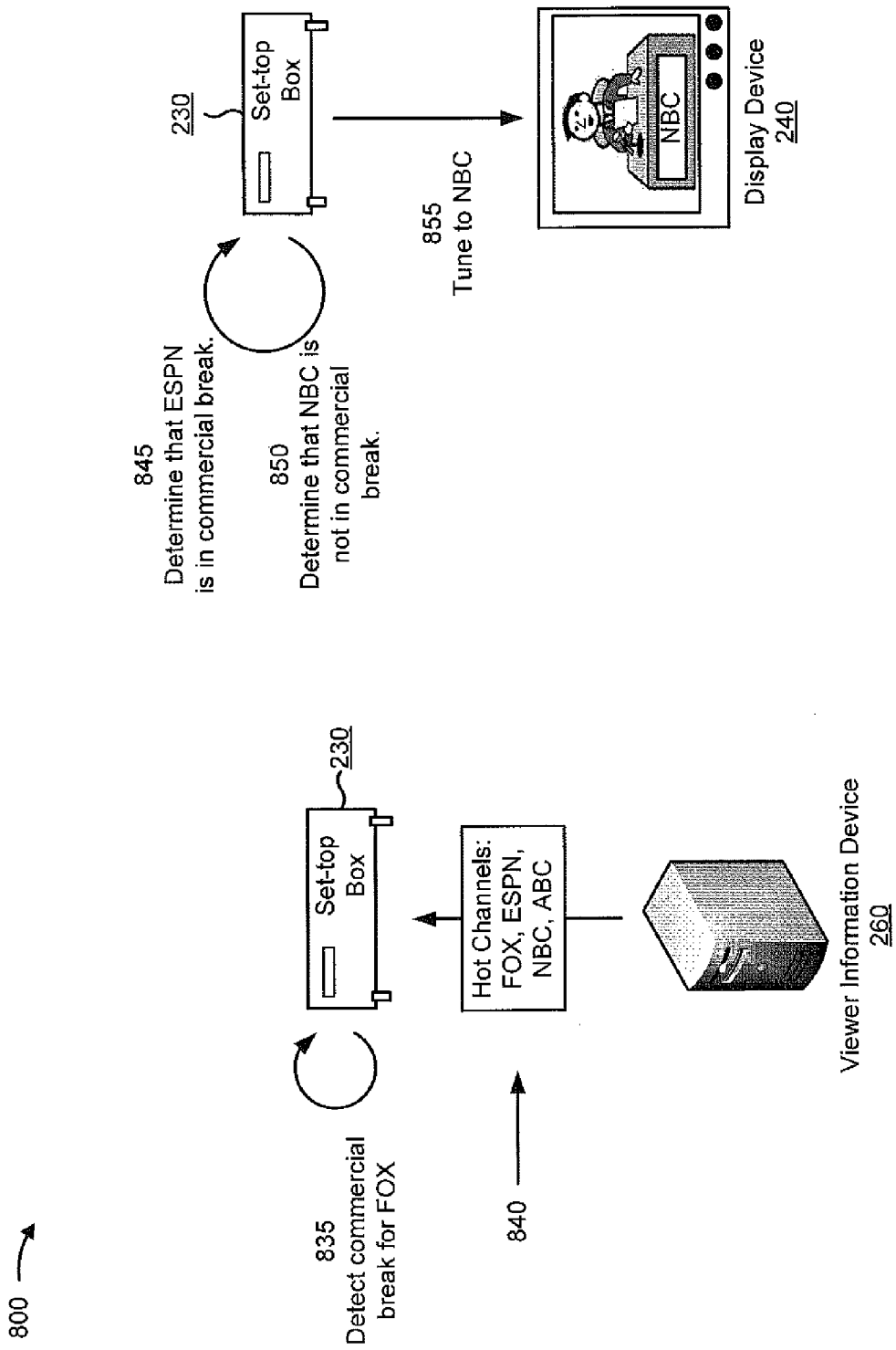

As shown in FIG. 8C, and by reference number 835, set-top box 230 detects a commercial break for FOX. Based on detecting the commercial break, set-top box 230 queries viewer information device 260 for a set of hot channels (e.g., a set of most watched channels at the time of the query), as shown by reference number 840. As shown in FIG. 8D, assume that set-top box 230 skips FOX from the set of hot channels because set-top box 230 is already tuned to FOX. As shown by reference number 845, set-top box 230 determines that another hot channel (e.g., "ESPN") is in a commercial break. As shown by reference number 850, set-top box 230 determines that yet another hot channel (e.g., "NBC") is not in commercial break. As shown by reference number 855, set-top box 230 tunes to NBC based on determining that NBC is not in a commercial break. Set-top box 230 provides NBC to display device 240 for display. Assume that set-top box 230 monitors FOX to determine whether the commercial break for FOX has ended.

As shown in FIG. 8E, and by reference number 860, set-top box 230 determines that NBC has entered a commercial break, and determines to tune to still another channel. Assume that set-top box 230 is not configured to monitor multiple anchor channels. As shown in FIG. 8F, and by reference number 865, set-top box 230 identifies still another hot channel (e.g., "ABC") based on determining that NBC has entered a commercial break. Set-top box 230 determines that ABC is not in a commercial break. As shown by reference number 870, set-top box 230 tunes to ABC, and ABC is provided via display device 240. Assume that set-top box 230 continues monitoring FOX to determine whether the commercial break for FOX has ended.

Figure 8G:
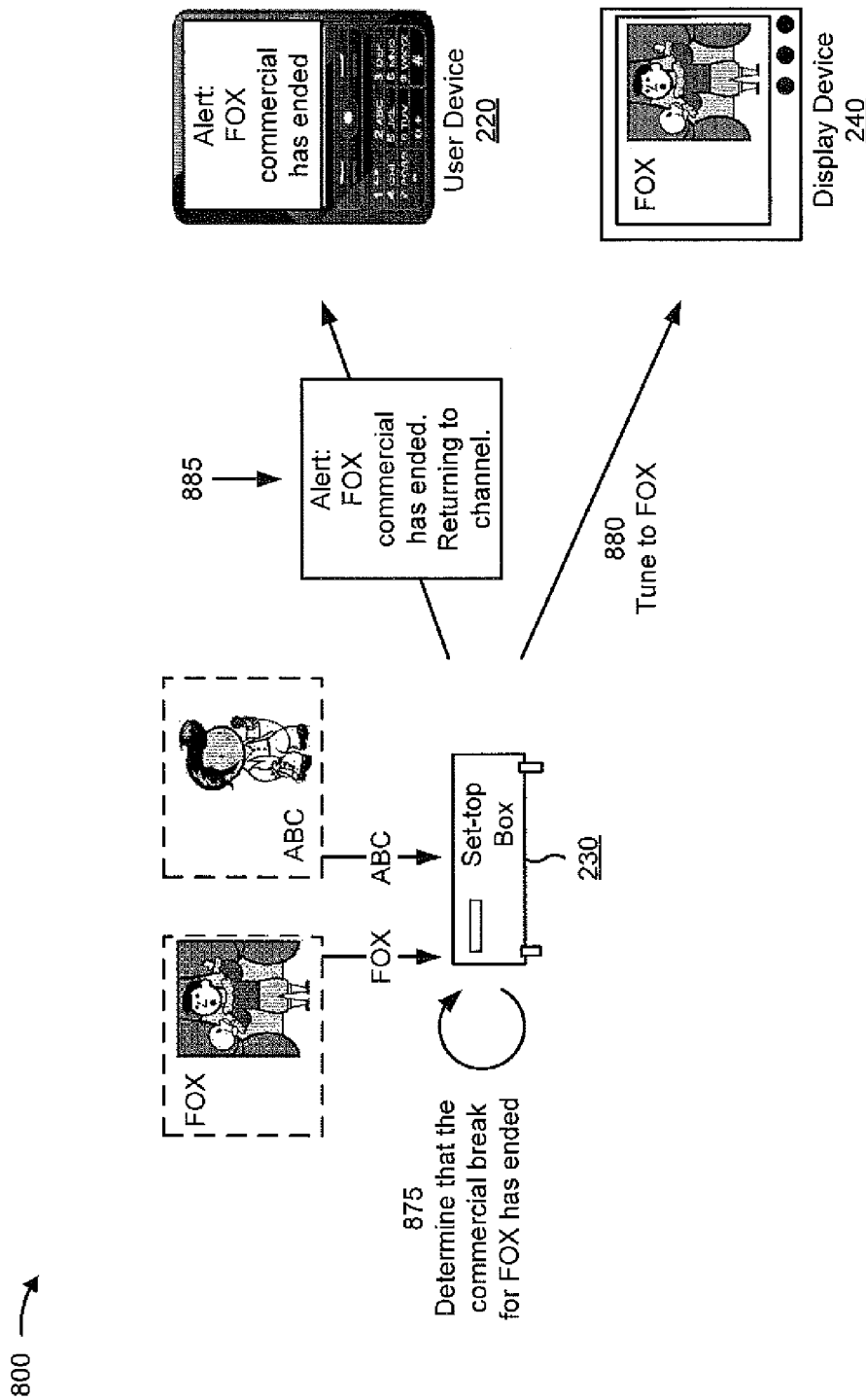

As shown in FIG. 8G, and by reference number 875, set-top box 230 determines that the commercial break for FOX has ended. As shown by reference number 880, set-top box 230 tunes to FOX, and FOX is provided via display device 240. As shown by reference number 885, based on returning to the anchor channel, set-top box 230 provides a notification to user device 220 (e.g., indicating that "FOX commercial has ended. Returning to channel.").

As indicated above, FIGS. 8A-8G are provided merely as an example. Other examples are possible and may differ from what was described with respect to FIGS. 8A-8G.

Implementations described herein may assist a set-top box in switching from an anchor channel, when a commercial break is detected for the anchor channel, to another channel that is not in a commercial break. Furthermore, the set-top box may detect that the commercial break for the anchor channel has concluded, and may return to the anchor channel. Furthermore, as discussed herein, although systems and methods may be described in terms of a set-top box and a television channel, the systems and methods may also be implemented in terms of a radio receiver and a radio program.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
    one or more processors to:
        determine a set of preferred channels;
        detect a commercial break for a first channel,
            the first channel being provided for output to a user via an output device;
        determine another channel to provide, from the set of preferred channels, based on detecting the commercial break for the first channel,
            the other channel not being associated with a commercial break;
        provide the other channel for output to the user via the output device;
        monitor the first channel to detect that the commercial break for the first channel has ended;
        record the first channel;
        determine that a user device is not within a particular proximity of the output device,
            the user device being different than the output device;
        provide an indication to the user, via the user device, that the commercial break for the first channel has ended based on the user device not being within the particular proximity of the output device;
        receive a request to return to the first channel from the user based on providing the indication to the user that the commercial break for the first channel has ended;
        determine a starting playback position in the recorded first channel based on the request to return to the first channel,
            the starting playback position being associated with detecting that the commercial break for the first channel has ended; and
        provide the recorded first channel at the starting playback position for output to the user via the output device.

2. The device of claim 1, where the one or more processors are further to:
    receive, from the user device, information that identifies a set of channel type preferences; and
    where the one or more processors, when determining the set of preferred channels, are further to:
        determine the set of preferred channels based on the set of channel type preferences.

3. The device of claim 1, where the one or more processors are further to:
    receive information identifying one or more viewership metrics; and
    where the one or more processors, when determining the set of preferred channels, are further to:
        determine the set of preferred channels based on the one or more viewership metrics.

4. The device of claim 1, where the one or more processors are further to:
    tune to the other channel;
    process a data stream associated with the other channel;
    determine that the other channel is not in a commercial break based on processing the data stream associated with the other channel; and
    where the one or more processors, when determining the other channel to provide, are further to:
        determine the other channel based on determining that the other channel is not in a commercial break.

5. The device of claim 1, where the one or more processors are further to:
    receive information identifying the user;
    retrieve a set of stored channel preferences associated with the user; and
    where the one or more processors, when determining the set of preferred channels, are further to:
        determine the set of preferred channels based on the set of stored channel preferences associated with the user.

6. A non-transitory computer-readable medium storing instructions, the instructions comprising:
    one or more instructions that, when executed by one or more processors, cause the one or more processors to:
        receive a request to configure segment skipping,
            the request including an indication of a segment to be skipped;
        determine a set of preferred channels associated with segment skipping based on receiving the request to configure segment skipping;

store an indication of the segment to be skipped and the set of preferred channels associated with segment skipping;
provide a first channel for output to a user via an output device;
determine that the first channel is providing the segment to be skipped;
select a second channel from the set of preferred channels associated with segment skipping based on determining that the first channel is providing the segment to be skipped;
determine that the second channel is not providing the segment to be skipped;
provide the second channel for output to the user, via the output device, based on determining that the second channel is not providing the segment to be skipped;
determine that the first channel is no longer providing the segment to be skipped;
record the first channel;
determine that a user device is not within a particular proximity of the output device,
the user device being different than the output device;
provide an indication to the user, via the user device, that the first channel is no longer providing the segment to be skipped,
the indication being provided based on the user device not being within the particular proximity of the output device;
receive a request to return to the first channel from the user based on providing the indication to the user that the first channel is no longer providing the segment to be skipped;
determine a starting playback position in the recorded first channel based on the request to return to the first channel,
the starting playback position being associated with detecting that the first channel is no longer providing the segment to be skipped; and
provide the recorded first channel at the starting playback position for output to the user via the output device.

7. The non-transitory computer-readable medium of claim 6, where the one or more instructions, that cause the one or more processors to determine that the first channel is no longer providing the segment to be skipped, further cause the one or more processors to:
monitor the first channel; and
determine that the first channel is no longer providing the segment to be skipped based on monitoring the first channel.

8. The non-transitory computer-readable medium of claim 6, where the one or more instructions, that cause the one or more processors to provide the second channel for output to the user, further cause the one or more processors to:
determine that the second channel has begun to provide the segment to be skipped;
select a third channel from the set of preferred channels associated with segment skipping based on determining that the second channel has begun to provide the segment to be skipped;
determine that the third channel is not providing the segment to be skipped; and
provide the third channel for output to the user based on determining that the third channel is not providing the segment to be skipped.

9. The non-transitory computer-readable medium of claim 8, where the one or more instructions, that cause the one or more processors to provide the third channel for output to the user, further cause the one or more processors to:
monitor the second channel;
determine that the second channel is no longer providing the segment to be skipped based on monitoring the second channel; and
provide the second channel for output to the user based on determining that the second channel is no longer providing the segment to be skipped.

10. The non-transitory computer-readable medium of claim 6, where the one or more instructions, when executed by the one or more processors, further cause the one or more processors to:
receive information identifying a popularity measurement associated with the set of preferred channels; and
where the one or more instructions, that cause the one or more processors to select a second channel from the set of preferred channels associated with segment skipping, further cause the one or more processors to:
determine a second channel based on the information identifying the popularity measurement associated with the set of preferred channels.

11. The non-transitory computer-readable medium of claim 6, where the one or more instructions, when executed by the one or more processors, further cause the one or more processors to:
receive information identifying a particular data signature associated with detecting the segment to be skipped; and
where the one or more instructions, that cause the one or more processors to determine that the first channel is providing the segment to be skipped, further cause the one or more processors to:
process the first channel;
determine a recorded data signature based on processing the first channel;
determine that the recorded data signature matches the particular data signature; and
determine that the first channel is providing the segment to be skipped based on determining that the recorded data signature matches the particular data signature.

12. The non-transitory computer-readable medium of claim 6, where the one or more instructions, that cause the one or more processors to determine that the first channel is providing the segment to be skipped, further cause the one or more processors to:
receive a message indicating that the first channel is providing the segment to be skipped; and
determine that the first channel is providing the segment to be skipped based on receiving the message indicating that the first channel is providing the segment to be skipped.

13. A method, comprising:
determining, by a device, one or more preferred channels;
determining, by the device, an anchor channel;
determining, by the device, that the anchor channel has commenced a commercial break;
determining, by the device, an alternate channel from the one or more preferred channels based on determining that the anchor channel has commenced the commercial break,
the alternate channel not being in another commercial break;
providing, by the device, the alternate channel via an output device;
monitoring, by the device, a characteristic associated with the anchor channel based on providing the alternate channel;

determining, by the device, that the anchor channel has concluded the commercial break based on monitoring the characteristic associated with the anchor channel;

recording, by the device, the anchor channel;

determining, by the device, that a user device is not within a particular proximity of the output device, the user device being different than the output device;

providing, by the device and to the user device, an indication that the anchor channel has concluded the commercial break based on the user device not being within the particular proximity of the output device;

receiving, by the device, a request to return to the anchor channel based on providing the indication that the anchor channel has concluded the commercial break;

determining, by the device, a starting playback position in the recorded anchor channel based on the request to return to the anchor channel, the starting playback position being associated with detecting that the anchor channel has concluded the commercial break; and providing, by the device, the recorded anchor channel at the starting playback position for output to the user via the output device.

14. The method of claim 13, where providing the anchor channel based on determining that the anchor channel has concluded the commercial break further comprises:

providing the anchor channel for display.

15. The method of claim 13, further comprising:

providing a set of available channels for user selection;

receiving a set of user rankings associated with the set of available channels; and where determining the one or more preferred channels further comprises:

determining the one or more preferred channels based on receiving the set of user rankings.

16. The method of claim 13, where monitoring the characteristic associated with the anchor channel further comprises:

processing the characteristic associated with the anchor channel; and where determining that the anchor channel has concluded the commercial break based on monitoring the characteristic associated with the anchor channel, further comprises:

determining that the characteristic associated with the anchor channel does not match a stored characteristic, the stored characteristic being associated with identifying commercial breaks; and determining that the anchor channel has concluded the commercial break based on determining that the characteristic associated with the anchor channel does not match the stored characteristic.

17. The method of claim 13, where monitoring the characteristic associated with the anchor channel further comprises:

receiving, from a server, a status associated with the anchor channel; and where determining that the anchor channel has concluded the commercial break, further comprises:

determining that the anchor channel has concluded the commercial break based on the status associated with the anchor channel.

18. The method of claim 13, where providing the alternate channel further comprises:

providing an indication that the alternate channel is being provided, the indication including at least one of:

a user identifier;

an anchor channel identifier; or an alternate channel identifier.

19. The device of claim 1, where the starting playback position starts at an end of the commercial break.

* * * * *